(12) United States Patent
Moriyama (10) Patent No.: US 11,584,201 B2
(45) Date of Patent: Feb. 21, 2023

(54) SIDE DOOR STRUCTURE OF VEHICLE

(71) Applicant: MAZDA MOTOR CORPORATION, Hiroshima (JP)

(72) Inventor: Yukihiro Moriyama, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 79 days.

(21) Appl. No.: 17/230,899

(22) Filed: Apr. 14, 2021

(65) Prior Publication Data

US 2021/0387516 A1 Dec. 16, 2021

(30) Foreign Application Priority Data

Jun. 10, 2020 (JP) .............................. JP2020-100855

(51) Int. Cl.
*B60J 5/04* (2006.01)

(52) U.S. Cl.
CPC ........... *B60J 5/0412* (2013.01); *B60J 5/0483* (2013.01)

(58) Field of Classification Search
CPC ...... B60J 5/0412; B60J 5/0433; B60J 5/0443; B60J 5/0483; B60J 5/0466; B60J 5/0481; B60J 5/0431; B60J 5/042; B60J 5/047; B60J 5/0472; B60J 5/0473
USPC .......................................... 296/146.11, 146.6
See application file for complete search history.

(56) References Cited

U.S. PATENT DOCUMENTS

| 8,287,966 B2 * | 10/2012 | Sundarraj | B22D 19/16 |
| | | | 427/427 |
| 9,758,998 B2 * | 9/2017 | Mildner | E05D 11/00 |
| 2013/0088037 A1 * | 4/2013 | Schurter | B21K 7/12 |
| | | | 49/506 |
| 2016/0145920 A1 * | 5/2016 | Fuetterer | E05D 5/0207 |
| | | | 29/897.2 |

FOREIGN PATENT DOCUMENTS

JP H06-072714 U 10/1994

* cited by examiner

*Primary Examiner* — Joseph D. Pape
*Assistant Examiner* — Veronica M Shull
(74) *Attorney, Agent, or Firm* — Studebaker & Brackett PC (57) ABSTRACT

There are provided an outer member, an inner member including a front-side vertical wall portion and a rear-side vertical wall portion, an impact bar extending from front-side attachment portions of the front-side vertical wall portion to rear-side attachment portions of the rear-side vertical wall portion, a hinge-reinforcement member reinforcing a hinge attachment portion where a hinge is attached to the front-side vertical wall portion, and a latch-reinforcement member reinforcing a latch-attachment portion where a latch device is attached to the rear-side vertical wall portion. The front-side vertical wall portion and the rear-side vertical wall portion are made of casting or high-strength resin, and the hinge-reinforcement member and the latch-reinforcement member are configured to have higher ductility than the front-side vertical wall portion and the rear-side vertical wall portion and connected to the impact bar.

18 Claims, 10 Drawing Sheets

SIDE DOOR STRUCTURE OF VEHICLE

BACKGROUND OF THE DISCLOSURE

The present disclosure relates to a side door structure of a vehicle which comprises an impact bar provided to extend from a front-side attachment portion which is formed at a front-side vertical wall portion to a rear-side attachment portion which is formed at a rear-side vertical wall portion.

Conventionally, a side door structure in which a door outer panel and a door inner panel are made of a light-alloy material, such as aluminum alloy, or a high-strength resin material, such as CFRP, for the purpose of improving the fuel economy of the vehicle by reducing the vehicle weight is known. In general, since the casting or the high-strength resin material are more superior in shaping properties than a wrought material, the door inner panel which has a complex three-dimensional shape is made of aluminum-alloy casting or the high-strength resin material and the door outer panel which has a simple shape is made of an aluminum-alloy wrought material. Further, a structure in which a side impact bar is provided to extend from the front-side vertical wall portion to the rear-side vertical wall portion of the door inner panel for the purpose of protecting passengers in a vehicle side collision is known.

A door for an automobile disclosed in Japanese Utility-Model Laid-Open Publication No. H06-072714 comprises an aluminum-alloy-casting-made front-side vertical frame (front-side vertical wall portion) where hinge-attachment brackets are integrally formed, an aluminum-alloy-casting-made rear-side vertical frame (rear-side vertical wall portion) where a lock attachment piece is integrally formed, an upper-side outer reinforcement and a lower-side outer reinforcement which are arranged at an upper-side position and a lower-side position of each of the both vertical frames, a guard bar (impact bar) which is arranged at a middle-stage position of each of the both vertical frames, an upper-side inner reinforcement which is arranged between the upper-side outer reinforcement and the guard bar, a lower-side inner reinforcement which is arranged between the guard bar and the lower-side outer reinforcement, and an outer panel which is joined to respective flange portions of the both vertical frames by hemming method, wherein the respective reinforcements and the guard bar are respectively made of the aluminum-alloy material and formed in a solid state by extrusion molding, and fixedly fastened to attachment portions (screw-hole area) which are formed at the both vertical frames, respectively.

Since the both vertical frames, the respective reinforcements, and others are respectively made of the aluminum-alloy material primarily in the door for the automobile disclosed in the above-described patent document, it is possible to achieve the weight reduction of a side door from a material aspect. However, there is a concern that it may not be sufficiently suppressed by the technology of the above-described patent document that the impact bar comes into a cabin in the vehicle side collision.

In the casting molding, the heat treatment, such as aging treatment, is applied in order to improve so-called dynamic properties, such as tensile strength, yield strength, and hardness. The casting is inferior to the wrought material in the ductility and the shock resistance, which is caused by the mutual interaction of a micro structure formed by crystal deposition according to the heat treatment and dislocation. Further, the high-strength resin material is also inferior to the wrought material in the ductility and the shock resistance. Accordingly, in a case where a collision load is applied to the impact bar in the vehicle side collision and there occurs stress concentration at the attachment portions of the impact bar, there is a concern that some cracks may be generated at the vertical frames at around the attachment portions and thereby the impact bar may come into the cabin improperly. Herein, while it may be considered that the thickness of the vertical frames around the attachment portions of the impact bar is made so great that the shock resistance of the vertical frames can be increased, there is a concern that this may improperly deteriorate the weight-reduction effect which is expected originally. That is, it is uneasy to compatibly attain the weight reduction of the side door and the performance improvement against the vehicle side collision.

SUMMARY OF THE DISCLOSURE

An object of the present disclosure is to provide a side door structure of a vehicle which can compatibly attain the weight reduction of the side door and the performance improvement against the vehicle side collision.

The present disclosure is the side door structure of the vehicle, comprising an outer member, an inner member connected to the outer member and including a front-side vertical wall portion and a rear-side vertical wall portion which are positioned respectively at a front side and a rear side, in a vehicle longitudinal direction, of the inner member, the front-side vertical wall portion being provided with a hinge rotatable relative to a vehicle body, the rear-side vertical wall portion being provided with a latch device capable of lock/unlock relative to the vehicle body, an impact bar provided to extend from a front-side attachment portion which is formed at the front-side vertical wall portion to a rear-side attachment portion which is formed at the rear-side vertical wall portion, a hinge-reinforcement member connected to the hinge and reinforcing a hinge attachment portion where the hinge is attached to the front-side vertical wall portion, and a latch-reinforcement member connected to the latch device and reinforcing a latch-attachment portion where the latch device is attached to the rear-side vertical wall portion, wherein at least one of the front-side vertical wall portion and the rear-side vertical wall portion is configured as a casting/resin-made vertical wall portion which is made of casting or a high-strength resin material, and the hinge-reinforcement member and/or the latch-reinforcement member which are provided at the casting/resin-made vertical wall portion are configured to have higher ductility than the casting/resin-made vertical wall portion and connected to the impact bar.

According to the present disclosure, since there are provided the hinge-reinforcement member connected to the hinge and reinforcing the hinge attachment portion where the hinge is attached to the front-side vertical wall portion and the latch-reinforcement member connected to the latch device and reinforcing the latch-attachment portion where the latch device is attached to the rear-side vertical wall portion, connection of the hinge connected to a vehicle body and the front-side vertical wall portion can be firm and connection of the latch device connected to the vehicle body and the rear-side vertical wall portion can be firm. Further, since at least one of the front-side vertical wall portion and the rear-side vertical wall portion is configured as the casting/resin-made vertical wall portion which is made of the casting or the high-strength resin material, the light weight of the side door can be attained by the casting molding using the light-alloy material, such as the aluminum alloy, or the high-strength resin material. Moreover, since the hinge-reinforcement member and/or the latch-reinforcement member which are provided at the casting/resin-made vertical wall portion are configured to have higher ductility than the casting/resin-made vertical wall portion and connected to the impact bar, even in a case where a portion of the casting vertical wall portion which is positioned around the impact-bar attachment portion gets broken because of the stress concentration in the vehicle side collision, the collision load applied to the impact bar can be dispersed to the vehicle body by way of the hinge-reinforcement member and/or the latch-reinforcement member which are provided at the casting/resin-made vertical wall portion, so that the impact bar can be properly prevented from coming into the cabin.

In an embodiment of the present disclosure, the front-side vertical wall portion and the rear-side vertical wall portion are configured as the casting/resin-made vertical wall portions which are made of the casting or the high-strength resin material, respectively, and both-end portions of the impact bar are connected to the hinge-reinforcement member and the latch-reinforcement member, respectively. According to this embodiment, the light weight of the side door can be attained more properly. Further, the collision load applied to the impact bar can be dispersed to the vehicle body by way of the hinge-reinforcement member and the latch reinforcement member, so that the impact bar can be prevented from coming into the cabin more properly.

In another embodiment of the present disclosure, the front-side vertical wall portion includes a plurality of the front-side attachment portions which are arranged along a longitudinal direction of the impact bar and a single or plurality of rib portions which extend in a vehicle width direction and connect the plural front-side attachment portions, and the rear-side vertical wall portion includes a plurality of the rear-side attachment portions which are arranged along the longitudinal direction of the impact bar and a single or plurality of rib portions which extend in the vehicle width direction and connect the plural rear-side attachment portions. According to this embodiment, a bending moment can be generated at the both end portions of the impact bar, respectively, so that the degree of the impact bar's coming into the cabin in the vehicle side collision can be reduced.

In another embodiment of the present disclosure, the front-side vertical wall portion is provided with a pair of upper-and-lower hinges, the hinge-reinforcement member is provided to reinforce the hinge attachment portion where the pair of hinges are attached, and a front end portion of the impact bar is connected to the hinge-reinforcement member at a position which is located between the pair of hinges. According to this embodiment, the collision load applied to the impact bar can be dispersed to the pair of upper-and-lower hinges by way of the hinge-reinforcing member, so that the support rigidity of the front end portion of the impact bar can be improved.

In another embodiment of the present disclosure, the rear-side vertical wall portion is provided to extend forwardly, in the vehicle longitudinal direction, from a corner portion which is formed at a lower end portion, the latch-reinforcement member is provided to extend from the latch attachment portion to the corner portion, and a rear end portion of the impact bar is connected to the latch-reinforcement member at the corner portion. According to this embodiment, the support rigidity of the rear end portion of the impact bar can be improved.

In another embodiment of the present disclosure, the inner member is provided with a beltline-reinforcement member which connects respective upper end portions of the front-side vertical wall portion and the rear-side vertical wall portion, the hinge-reinforcement member is provided to extend from the hinge attachment portion to the upper end portion of the front-side vertical wall portion, the latch reinforcement member is provided to extend from the latch attachment portion to the upper end portion of the rear-side vertical wall portion, and front-and-rear end portions of the beltline-reinforcement member are connected to respective upper end portions of the hinge-reinforcement member and the latch reinforcement member. According to this embodiment, the collision load applied to the impact bar can be dispersed to the vehicle body by way of the hinges and the latch device and also dispersed to the beltline-reinforcement member, so that the impact bar's coming into the cabin can be further prevented.

Herein, it may be preferable that the front-side vertical wall portion and the rear-side vertical wall portion be respectively made of the aluminum-alloy casting having a specified thickness, and the hinge-reinforcement member and the latch-reinforcement member be respectively made of a pressed steel plate which has the higher ductility than the aluminum-alloy casting.

The present disclosure will become apparent from the following description which refers to the accompanying drawings.

DETAILED DESCRIPTION OF THE DISCLOSURE

Hereafter, an embodiment of the present disclosure will be described referring to the drawings. Herein, the following description of the embodiment relates to just one example and does not limit applications or usages of the present disclosure.

Figure 1:
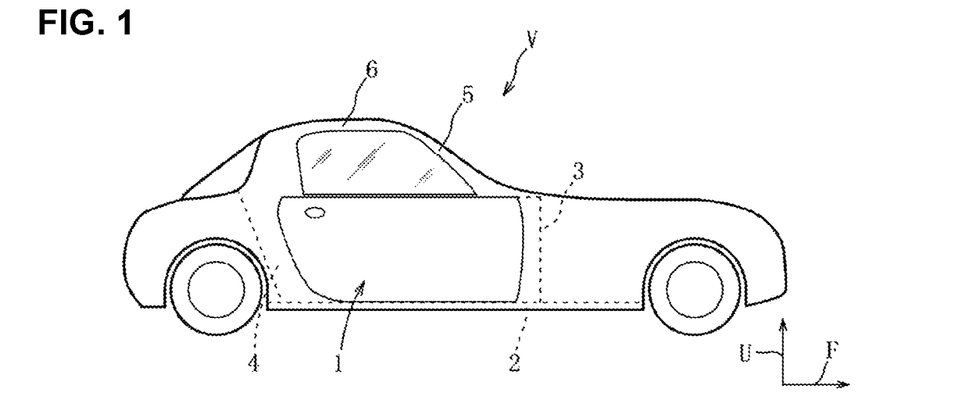
FIG. 1 is a right side view of a vehicle which is equipped with a side door structure according to an embodiment.

The present embodiment will be described referring to FIGS. 1-18. As shown in FIG. 1, a vehicle V of the present embodiment is a two-door hard top type of passenger car and comprises a pair of right-and-left sashless (non-sash) type of side doors 1. This vehicle V has a right-and-left symmetrical structure, and therefore a right-side part of the vehicle will be described primarily. In the figures, an arrow F shows a forward direction, an arrow OUT shows an outward direction, in a vehicle width direction, and an arrow U shows an upward direction, respectively.

The vehicle V comprises a side sill 2 extending in a vehicle longitudinal direction, a hinge pillar 3 extending upwardly from the side sill 2, a center pillar 4 extending upwardly from the side sill 2 on a rearward side of the hinge pillar 3, a front pillar 5 extending obliquely upwardly-and-rearwardly from an upper end portion of the hinge pillar 3, a roof side rail 6 connecting the front pillar 5 and an upper end portion of the center pillar 4, and others. The side door 1 is configured to open and close a door opening portion which is formed by these vehicle-body frame members 2-6.

Figure 2:
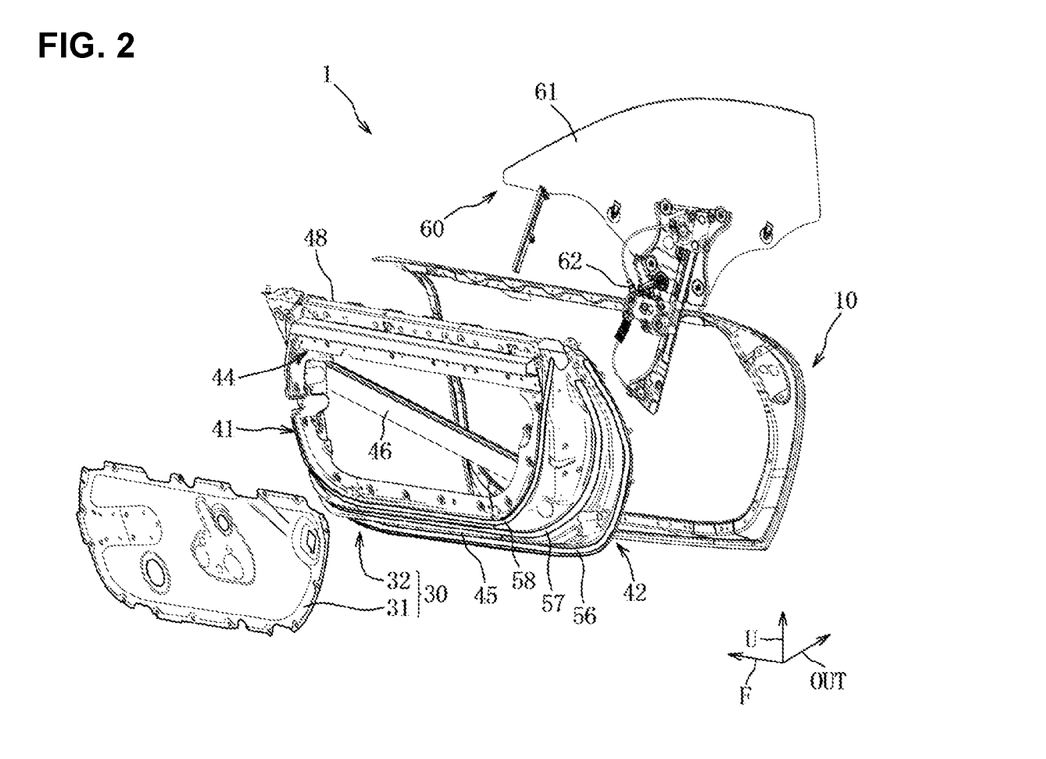
FIG. 2 is an exploded perspective view of a side door.

As shown in FIG. 2, the side door 1 comprises mainly an outer member 10 which constitutes an outward-side portion, in the vehicle width direction, thereof, an inner member 30 which constitutes an inward-side portion, in the vehicle width direction, thereof, and functional door components (accessories) including an aluminum-alloy-made impact bar 46, a door glass unit 60, and others. The outer member 10 and the inner member 30 are respectively made of a lightweight alloy material, such as aluminum alloy, primarily.

Figure 3:
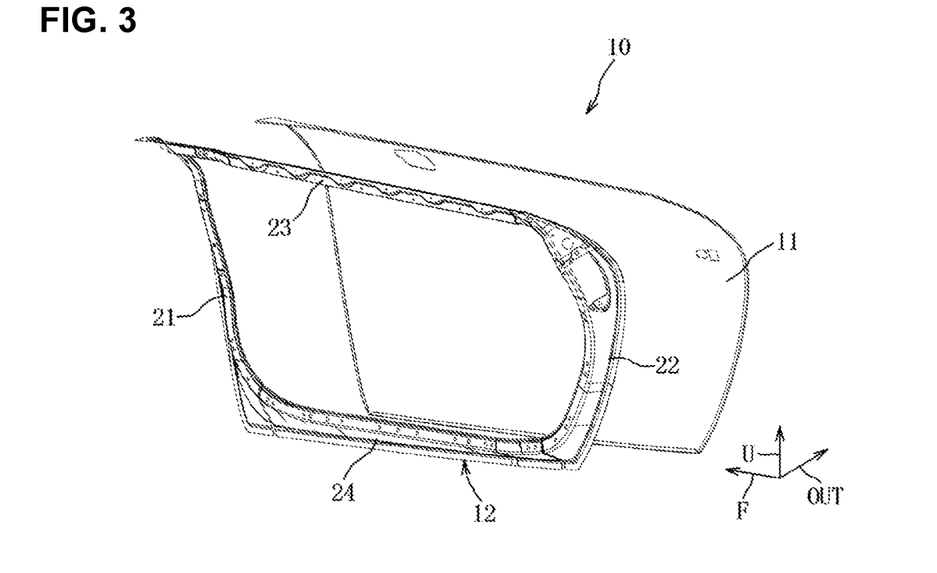
FIG. 3 is an exploded perspective view of an outer member.

First, the outer member 10 will be described. As shown in FIG. 3, the outer member 10 includes an outer panel 11 which forms a curved design surface portion and is formed in a nearly rectangular shape in a side view, an annular frame member 12 which is joined to an outer peripheral portion of the outer panel 11 by a hemming method and formed in a nearly rectangular shape in the side view, and others. The outer panel 11 and the frame member 12 are respectively made of a panel of an aluminum-alloy material, e.g., formed by pressing a wrought material having the thickness of 0.8 mm.

The frame member 12 comprises a front frame portion 21 which extends in a vertical direction, a rear frame portion 22 which extends in the vertical direction on a rearward side of the front frame portion 21, an upper frame portion 23 which connects the front frame portion 21 and an upper end portion of the rear frame portion 22 in the longitudinal direction, and a lower frame portion 24 which connects the front frame portion 21 and a lower end portion of the rear frame portion 22 in the longitudinal direction. Each of these frame portions 21-24 is provided with hem portions 21a-24a which are respectively clamped into the outer peripheral edge portion of the outer panel 11 by hemming and connection wall portions 21b-24b which are fixedly fastened to the inner member 30 by fastening members b1. A beltline-seal outer member (not illustrated) are attached to the connection wall portion 23b.

Figure 13:
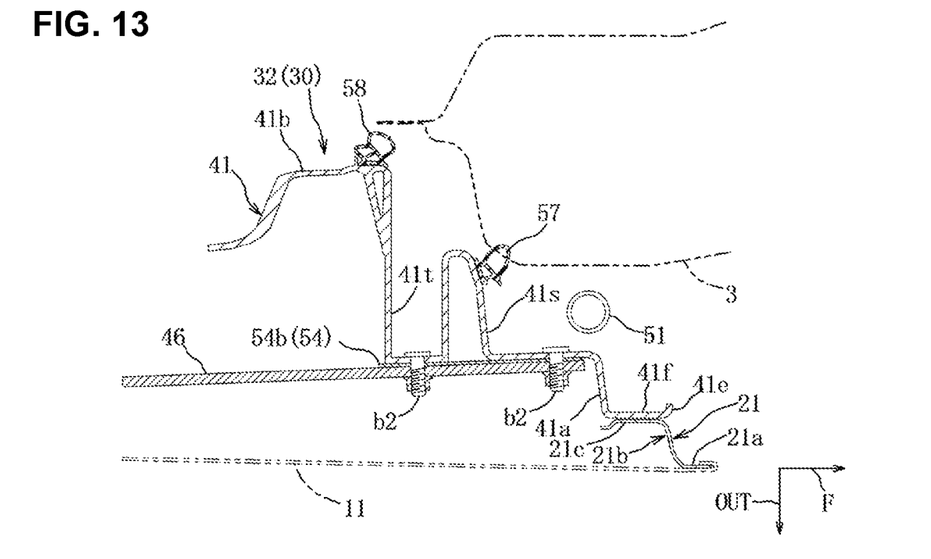
FIG. 13 is a sectional view taken along line XIII-XIII of FIG. 6.
Figure 14:
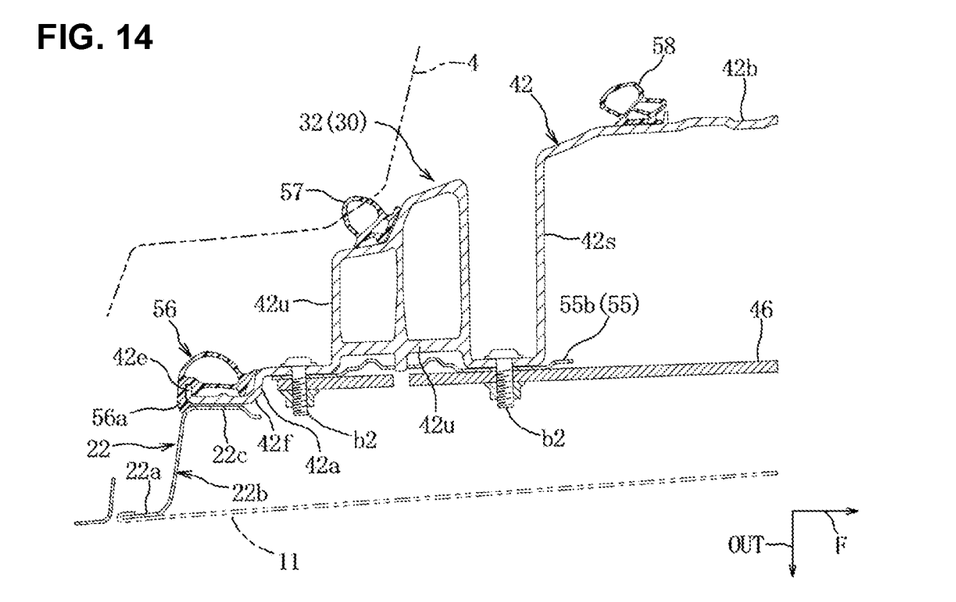
FIG. 14 is a sectional view taken along line XIV-XIV of FIG. 6.
Figure 15:
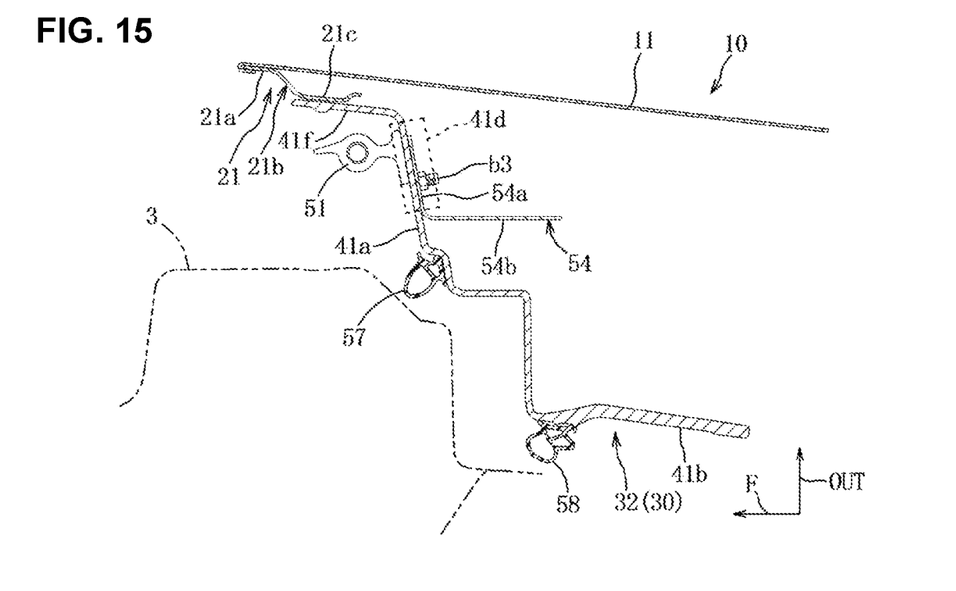
FIG. 15 is a sectional view taken along line XV-XV of FIG. 5.

As shown in FIGS. 13 and 15, the connection wall portion 21b is configured such that it is bent inwardly, in the vehicle width direction, from a rear-side (inner peripheral-side) portion of the hem portion 21a and includes a frame attachment portion 21c which forms a face which is nearly perpendicular to the vehicle width direction. As shown in FIGS. 11, 12, 14 and 16, the connection wall portion 22b is configured such that it is bent inwardly, in the vehicle width direction, from a front-side (inner peripheral-side) portion of the hem portion 22a and includes a frame attachment portion 22c which forms a face nearly perpendicular to the vehicle width direction. Likewise, the connection wall portions 23b, 24b include the frame attachment portions 23c, 24c forming faces nearly perpendicular to the vehicle width direction, respectively.

Next, the inner member 30 will be described. As shown in FIG. 2, the inner member 30 includes an inner panel 31 which forms a cabin-side wall portion and is formed in a nearly rectangular shape in the side view, a nearly-rectangular annular frame member 32 which supports the inner panel 31 and various kinds of functional door components and constitutes a frame portion of the side door 1, and others. The inner panel 31 is made of a panel of the aluminum-alloy material, e.g., formed by pressing the wrought material having the thickness of 0.8 mm.

Figure 4:
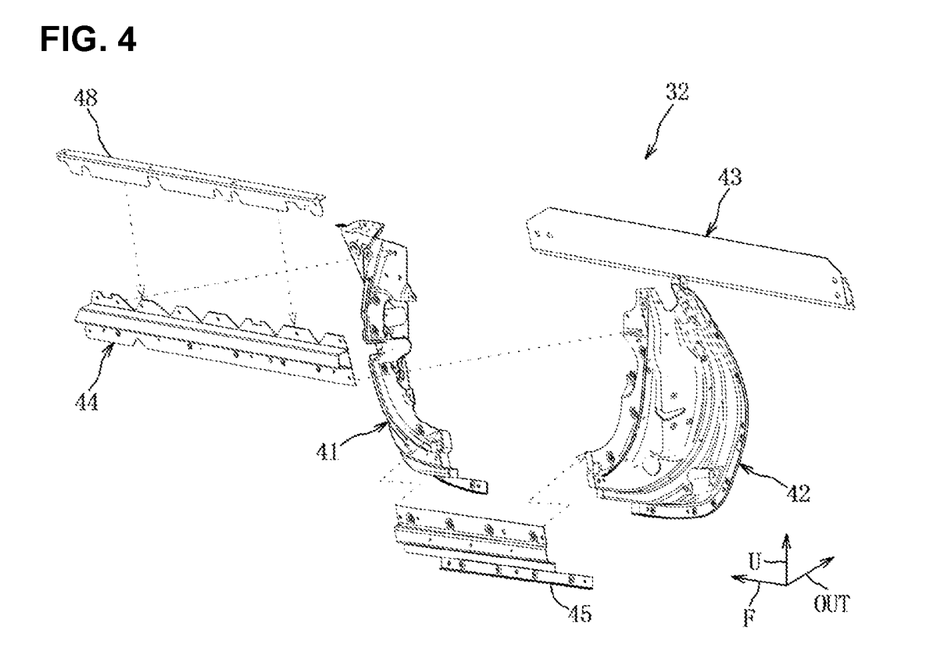
FIG. 4 is an exploded perspective view of frame members.

As shown in FIG. 4, the frame member 32 comprises a front-side vertical wall portion 41 which extends in the vertical direction, a rear-side vertical wall portion 42 which extends in the vertical direction on the rearward side of the front-side vertical wall portion 41, a beltline-reinforcement outer member 43 which connects respective upper end portions of the front-side vertical wall portion 41 and the rear-side vertical wall portion 42, a beltline-reinforcement inner member 44 which connects the respective upper end portions of the front-side vertical wall portion 41 and the rear-side vertical wall portion 42 and is separated inwardly from the beltline-reinforcement outer member 43, and a lower wall portion 45 which connects respective lower end portions of the front-side vertical wall portion 41 and the rear-side vertical wall portion 42 by a fastening member. In the present embodiment, the front-side vertical wall portion 41 and the rear-side vertical wall portion 42 correspond to a casting vertical wall portion, respectively.

The front-side vertical wall portion 41 and the rear-side vertical wall portion 42 are respectively made of casting using the aluminum-alloy material, e.g., the aluminum-alloy casting having the thickness of 1.5-2.0 mm. The beltline-reinforcement outer member 43 and the beltline-reinforcement inner member 44 are respectively formed in a nearly straight shape by extrusion molding using the aluminum-alloy material. The lower wall portion 45 is made of the panel of the aluminum-alloy material, e.g., formed by pressing the wrought material having the thickness of 0.8 mm.

As shown in FIGS. 7-9, 13 and 15, the front-side vertical wall portion 41 includes a front wall portion 41a which is perpendicular to the longitudinal direction, an inner wall portion 41b which is continuous to an inward end portion, in the vehicle width direction, of the front wall portion 41a and perpendicular to the vehicle width direction, and a flange portion 41f which is perpendicular to the vehicle width direction at its outer peripheral edge portion, and this front-side vertical wall portion 41 extends rearwardly from a corner portion 41c which is formed at its lower end portion. A bent portion 41e which is bent and extends inwardly, in the vehicle width direction, is formed at an outer peripheral edge portion extending from the corner portion 41c to the flange portion 41f. The flange portion 41f is fixedly fastened to the frame attachment portion 21c by the detachable fastening members b1, overlapping with the frame attachment portion 21c.

Figure 9:
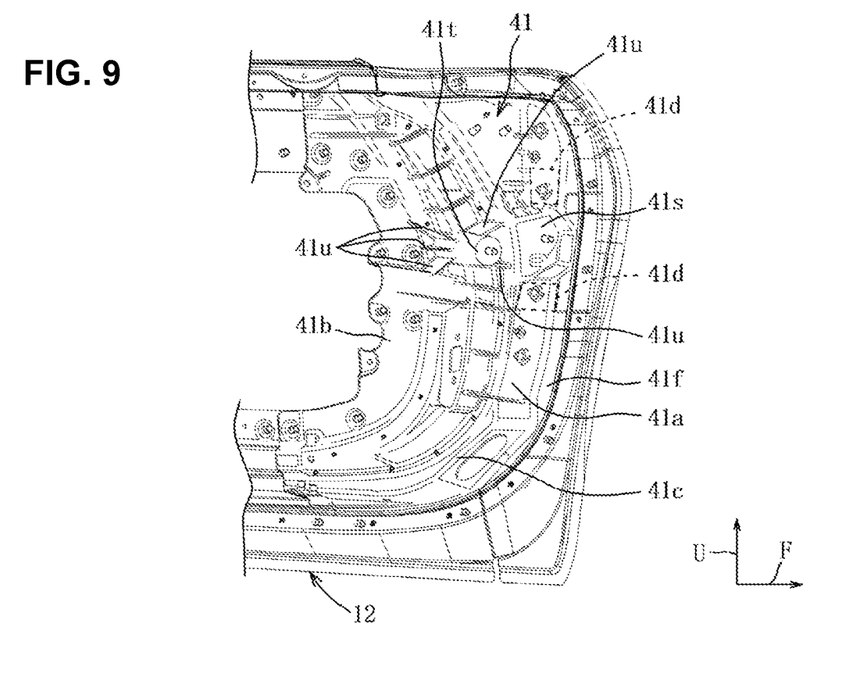
FIG. 9 is an outside view of a front-side vertical wall portion.

A pair of front-and-rear front-side attachment portions 41s, 41t for fixing the impact bar 46 to the front-side vertical wall portion 41 and plural rib portions 41u are provided at around a middle stage portion of the front-side vertical wall portion 41. The pair of front-side attachment portions 41s, 41*t* are formed in a partially cylindrical shape and provided to protrude outwardly, in the vehicle width direction, from the inner wall portion 41*b*, respectively. The front-side attachment portions 41*s*, 41*t* are arranged along an axial center of the impact bar 46, and the front-side attachment portion 41*s* is positioned on a front-upper side of the front-side attachment portion 41*t*. The plural rib portions 41*u* are provided to extend outwardly, in the vehicle width direction, from the inner wall portion 41*b* and connected to respective side wall portions of the front-side attachment portions 41*s*, 41*t*. As shown in FIG. 9, a part of the plural rib portions 41*u* are aligned vertically and connect the side wall portion of the front-side attachment portion 41*s* and the side wall portion of the front-side attachment portion 41*t*.

As shown in FIGS. 5-8, 13 and 15, the front-side vertical wall portion 41 includes a pair of upper-and-lower steel-made hinges 51 which are provided at its upper half part, a pair of upper-and-lower hinge attachment portions 41*d* for attaching the pair of hinges 51, and a hinge-reinforcement member 54 (reinforcement member for casting) for reinforcing the hinge attachment portions 41*d*. As shown in FIG. 9, the pair of hinge attachment portions 41*d* are provided to interpose the front-side attachment portion 41*s* therebetween. The pair of hinges 51 are configured such that each front end portion is fixedly fastened to the hinge pillar 3 and each other end portion is fixedly fastened to the hinge attachment portion 41*d* provided at the front wall portion 41*a*, and rotatably support the side door 1 around a vertically-extending rotational axis.

Figure 8:
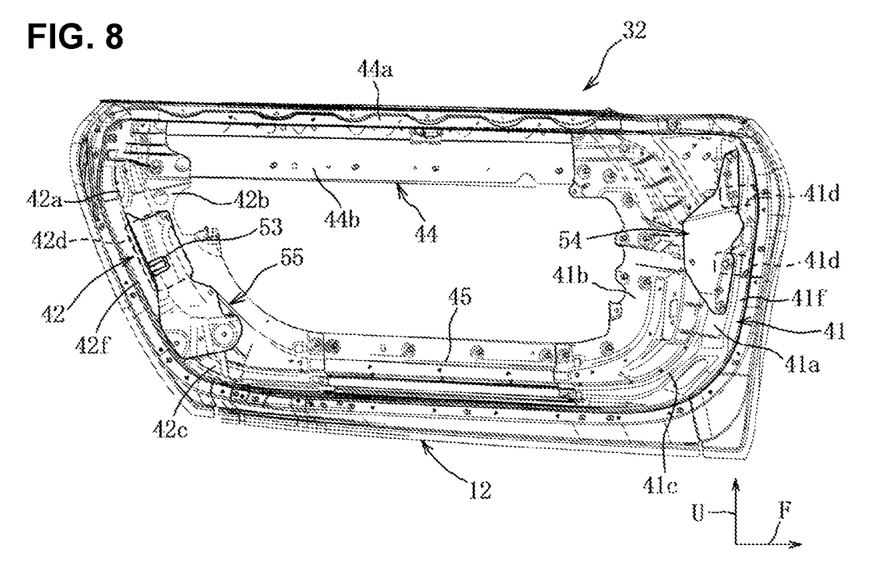
FIG. 8 is an outside view of the side door, in which door components are omitted from a state shown in FIG. 6.
Figure 17:
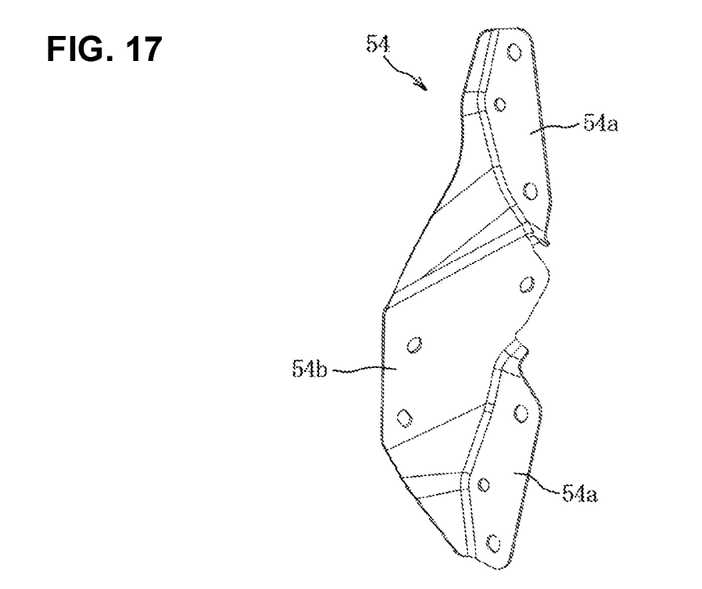
FIG. 17 is a perspective view of a hinge-reinforcement member.

The hinge-reinforcement member 54 is made of a material which has higher ductility than the aluminum-alloy casting, such as a pressed steel plate. As shown in FIGS. 8 and 17, the hinge reinforcement member 54 includes a pair of upper-and-lower hinge connection portions 54*a* which are provided to overlap with respective rear face portions of the pair of hinge attachment portions 41*d* and an impact-bar connection portion 54*b* which are provided to extend nearly perpendicularly to these hinge connection portions 54*a* and overlap with respective tops of the front-side attachment portions 41*s*, 41*t*.

Three bolt holes are formed at each of the pair of hinge connection portions 54*a*, and two bolt holes are formed at the impact-bar connection portion 54*b*. As shown in FIG. 13, the impact-bar connection portion 54*b* are fastened, together with the front end portion of the impact bar 46, to the tops of the front-side attachment portions 41*s*, 41*t* by the fastening members b2 inserted into the above-described bolt holes. As shown in FIG. 15, the pair of hinge connection portions 54*a* are fastened, together with the pair of hinges 51, to the pair of hinge portions 41*d* by fastening members b3 inserted into the above-described bolt holes. Thereby, the collision load applied to the impact bar 46 is dispersed from the hinge-reinforcement member 54 to the hinge pillar 3 by way of the pair of hinges 51.

As shown in FIGS. 7, 8, 10-12, 14 and 16, the rear-side vertical wall portion 42 includes a rear wall portion 42*a* which is perpendicular to the longitudinal direction, an inner wall portion 42*b* which is continuous to an inward end portion, in the vehicle width direction, of the rear wall portion 42*a* and perpendicular to the vehicle width direction, and a flange portion 42*f* which is perpendicular to the vehicle width direction at its outer peripheral edge portion, and this rear-side vertical wall portion 42 extends forwardly from a corner portion 42*c* which is formed at its lower end portion. A bent portion 42*e* which is bent and extends inwardly, in the vehicle width direction, is formed at an outer peripheral edge portion of the flange portion 42*f*. The flange portion 42*f* is configured to overlap with and fixedly fastened to the frame attachment portion 22*c* by the plural detachable fastening members b1. Herein, reference character 7 denotes an interior trim, and reference character 59 denotes a door trim.

Figure 10:
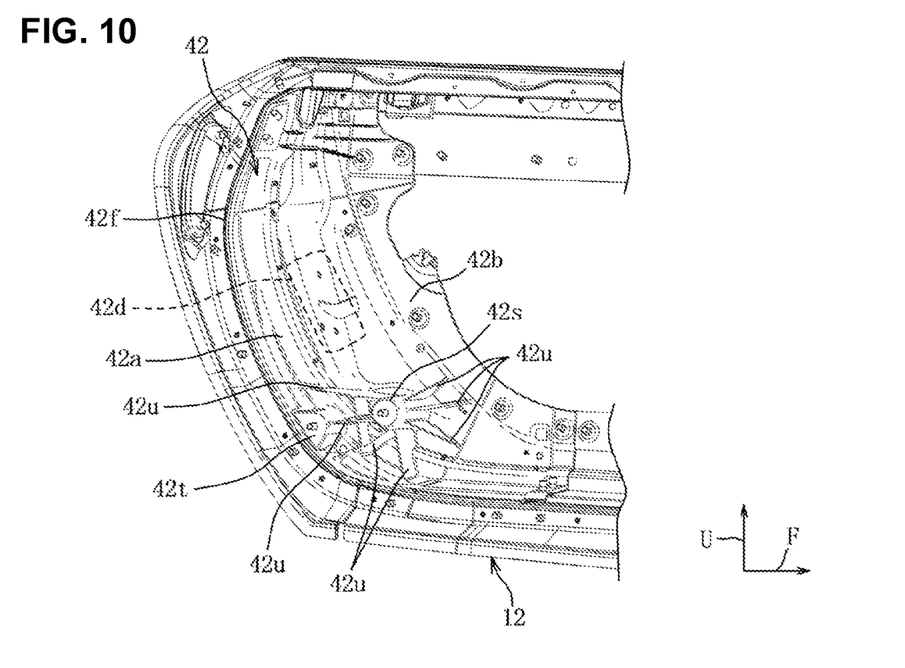
FIG. 10 is an outside view of a rear-side vertical wall portion.
Figure 11:
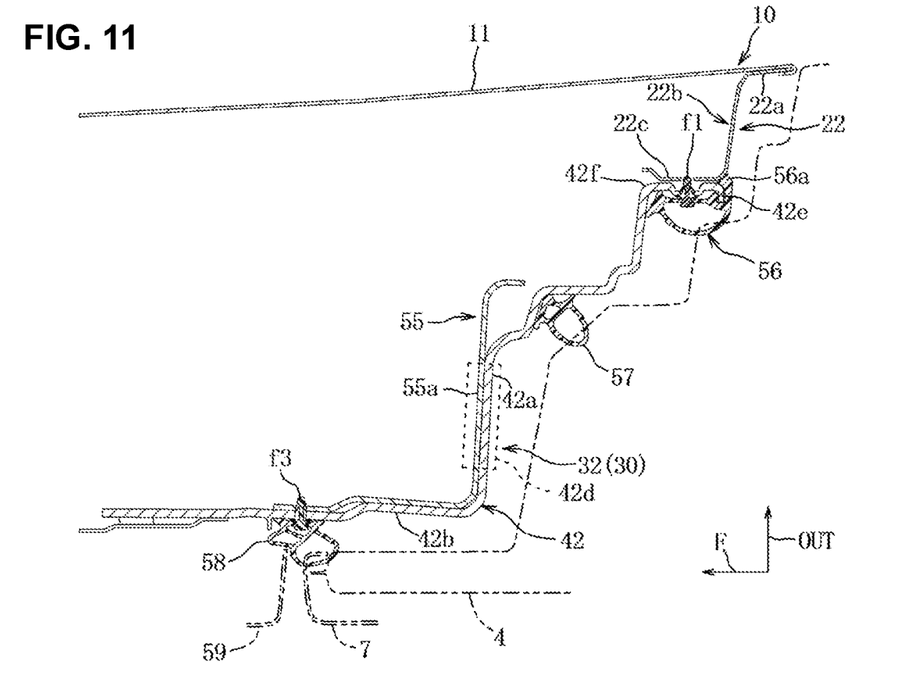
FIG. 11 is a sectional view taken along line XI-XI of FIG. 5.
Figure 12:
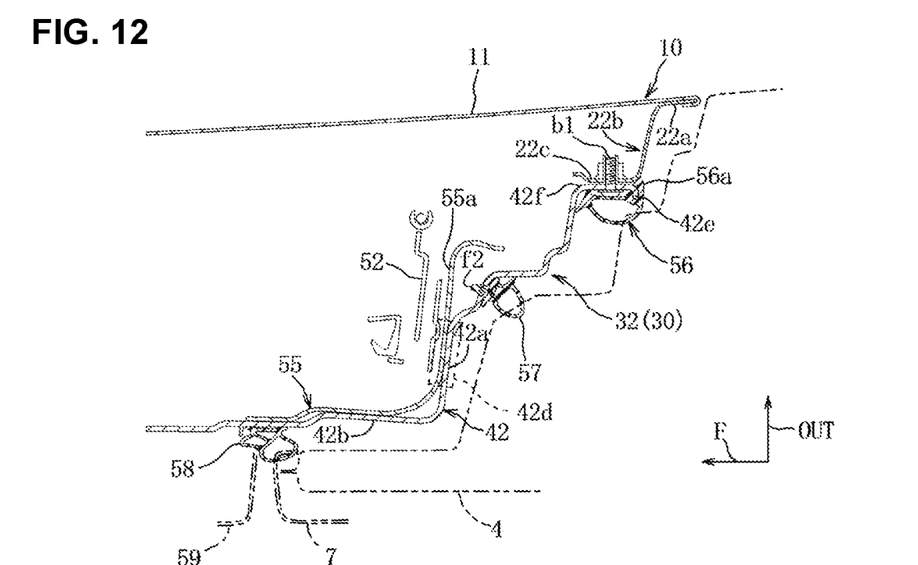
FIG. 12 is a sectional view taken along line XII-XII of FIG. 5.

A pair of front-and-rear front-side attachment portions 42*s*, 42*t* for fixing the impact bar 46 to the rear-side vertical wall portion 42 and plural rib portions 42*u* are provided at the corner portion 42*c*. The pair of front-side attachment portions 42*s*, 42*t* are formed in a partially cylindrical shape and provided to protrude outwardly, in the vehicle width direction, from the inner wall portion 42*b*, respectively. The rear-side attachment portion 42*s* is arranged along an axial center of the impact bar 46 on a front-upper side of the rear-side attachment portion 42*t*. The plural rib portions 42*u* are provided to extend outwardly, in the vehicle width direction, from the inner wall portion 42*b* and connected to respective side wall portions of the rear-side attachment portions 42*s*, 42*t*. As shown in FIG. 10, a part of the plural rib portions 42*u* connect the side wall portion of the rear-side attachment portion 42*s* and the side wall portion of the rear-side attachment portion 42*t* along a direction of the axial center of the impact bar 46, and the other part of the rib portions 42*u* connect the rear wall portion 42*a* and the side wall portion of the rear-side attachment portion 42*s*.

As shown in FIGS. 6, 8, 11, 12 and 16, the rear-side vertical wall portion 42 includes a latch device 52 which is provided at its middle stage portion, a latch attachment portion 42*d* for attaching the latch device 52, and a latch-reinforcing member 55 (reinforcement member for casting) for reinforcing the latch attachment portion 42*d*. The latch device 52 comprises a steel-made lock member (not illustrated), a steel-made casing for storing the lock member, and so on, and is configured to be engaged with a U-shaped striker 53 which is fixed to the center pillar 4. When the lock member is engaged with the striker 53, the side door 1 is made in a lock state, and when the lock member is disengaged from the striker 53, the side door 1 is made in an unlock state.

Figure 18:
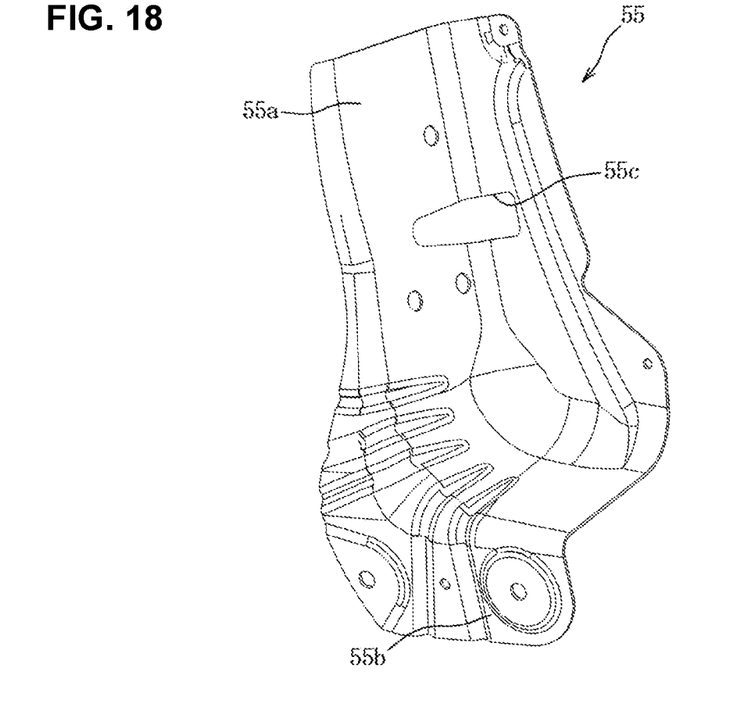
FIG. 18 is a perspective view of a latch-reinforcement member.

The latch-reinforcement member 55 is made of a material which has the higher ductility than the aluminum-alloy casting, such as the pressed steel plate. As shown in FIGS. 8 and 18, the latch-reinforcement member 55 includes a latch connection portion 55*a* which is provided to overlap with a front face portion of the latch attachment portion 42*d* and an impact-bar connection portion 55*b* which is provided to extend nearly perpendicularly to the latch connection portion 55*a* and overlap with respective tops of the rear-side attachment portions 42*s*, 42*t*. The latch connection portion 55*a* is configured such that an inward-side portion, in the vehicle width direction, thereof is bent and extends forwardly along the inner wall portion 42*b* and its lower-side portion extends up to the corner portion 42*c*.

Figure 16:
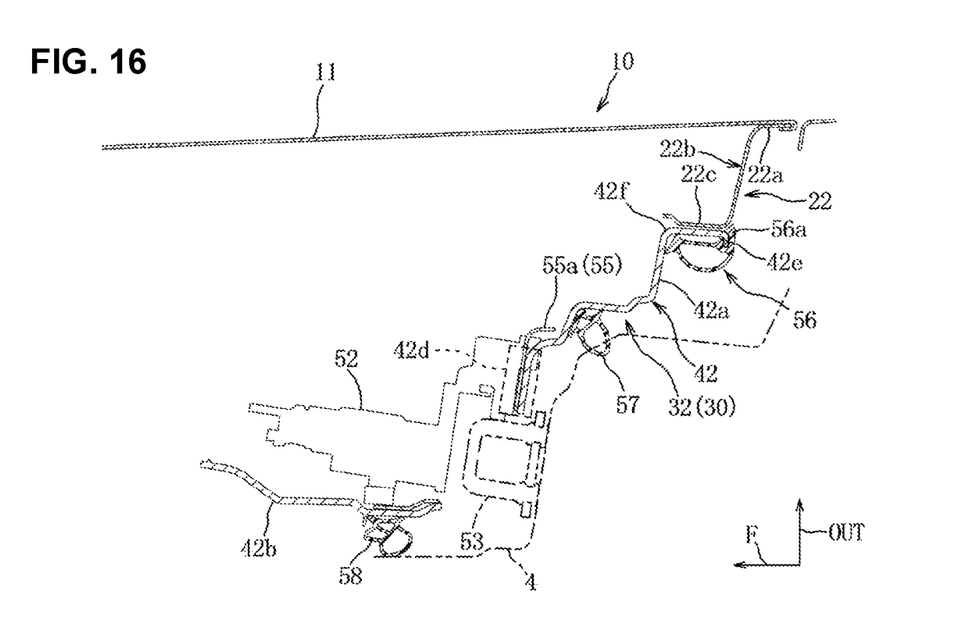
FIG. 16 is a sectional view taken along line XVI-XVI of FIG. 5.

The latch connection portion 55*a* has three bolt holes and a striker opening portion 55*c* where the striker 53 is inserted, and the impact-bar connection portion 55*b* has two bolt holes. As shown in FIG. 14, the impact-bar connection portion 55*b* is fastened, together with the rear end portion of the impact bar 46, to the tops of the rear-side attachment portions 42*s*, 42*t* by the fastening members b2 inserted into the above-described bolt holes. As shown in FIG. 16, the latch connection portion 55*a* is fastened, together with the latch device 52, to the latch attachment portion 42*d* by a fastening member (not illustrated) inserted into a bolt hole. Thereby, the impact load applied to the impact bar 46 is dispersed from the latch-reinforcement member 55 to the center pillar 4 by way of the striker 53.

Figure 6:
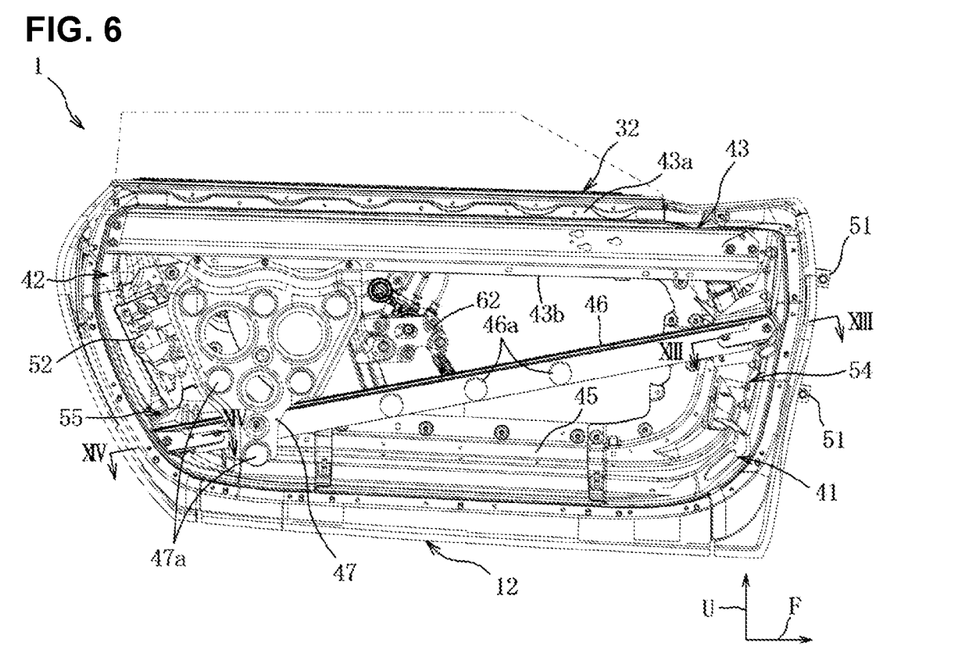
FIG. 6 is an outside view of the side door, in which an outer panel and an inner panel are omitted.

Next, the beltline-reinforcement outer member 43 and the beltline-reinforcement inner member 44 will be described. As shown in FIGS. 4 and 6, the beltline-reinforcement outer member 43 which extends linearly in the longitudinal direction is configured to have a closed-cross section (formed in a hollow shape). A front end portion and a rear end portion of the closed-cross section of the beltline-reinforcement outer member 43 are fastened to respective outward-side upper end portions, in the vehicle width direction, of the front-side vertical wall portion 41 and the rear-side vertical wall portion 42 by plural fastening members. The beltline-reinforcement outer member 43 comprises an outer upper vertical wall portion 43a which extends linearly at an upper end portion of the closed-cross section and an outer lower vertical wall portion 43b which extends linearly at a lower end portion of the closed-cross section. A connection wall portion 23b is attached to an upper portion of the outer upper vertical wall portion 43a.

Figure 7:
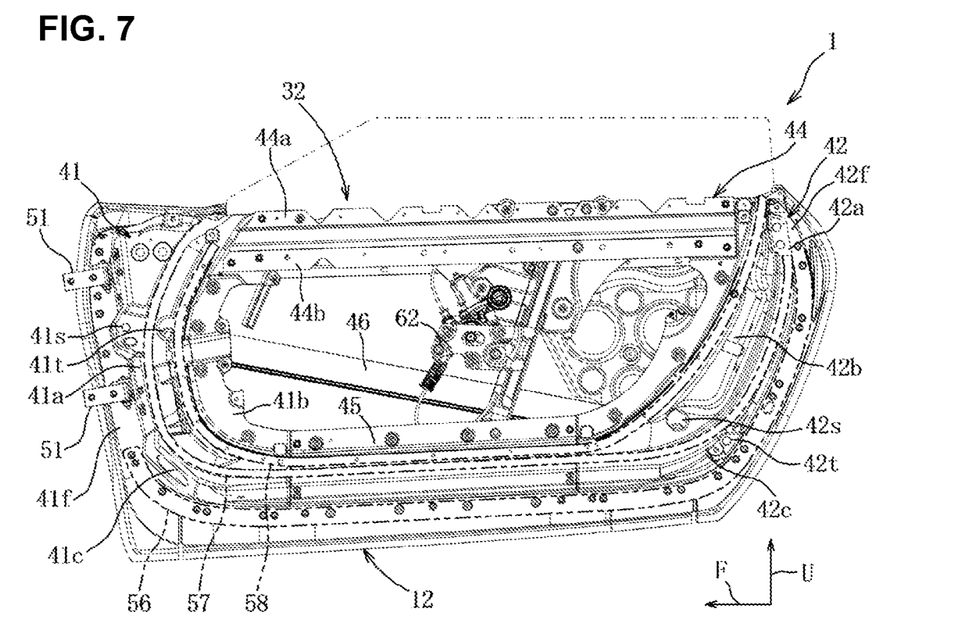
FIG. 7 is an inside view of the side door, in which the outer panel, the inner panel, and a covering member are omitted.

As shown in FIGS. 4 and 7, the beltline-reinforcement inner member 44 which extends linearly in the longitudinal direction is configured to have a closed-cross section (formed in a hollow shape). The beltline-reinforcement inner member 44 comprises an inner upper vertical wall portion 44a which extends linearly at an upper end portion of the closed-cross section and an inner lower vertical wall portion 44b which extends linearly at a lower end portion of the closed-cross section. The beltline-reinforcement inner member 44 is configured such that the inner upper vertical wall portion 44a is fastened to respective inward-side upper end portions, in the vehicle width direction, of the front-side vertical wall portion 41 and the rear-side vertical wall portion 42 by fastening members at a single point each and the inner lower vertical wall portion 44b is fastened to respective inward-side upper end portions, in the vehicle width direction, of the front-side vertical wall portion 41 and the rear-side vertical wall portion 42 by fastening members at two points each.

Figure 5:
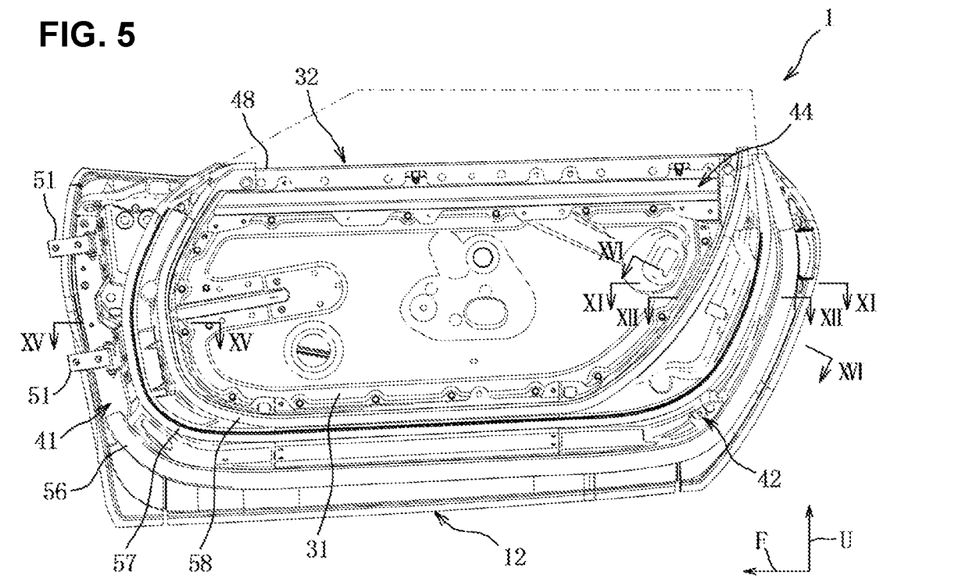
FIG. 5 is an inside view of the side door.

As shown in FIGS. 5-7, at the frame member 32 are provided the impact bar 46, a stiffener 47, a covering member 48, first through third seal members 56-58, the door glass unit 60, a pair of beltline seal members, and others. The impact bar 46 is, as described above, arranged in an inclined state such that its front side is located at the higher level than its rear side over a range from the middle stage portion of the front-side vertical wall portion 41 to the corner portion 42c of the rear-side vertical wall portion 42. Plural sealer members 46a which are capable of adhering to a back face of the outer panel 11 are provided at an outward-side wall face, in the vehicle width direction, of the impact bar 46.

The stiffener 47 is a member to secure the tensional rigidity of a rear half part of the outer panel 11. The aluminum-alloy-made stiffener 47 is configured in the inverse triangular shape in the side view, three points of its upper portion are fastened to the outer lower vertical wall portion 43b and a single point of its lower portion is fastened to the impact bar 46. Plural (e.g., three) punched portions are formed at the stiffener 47 to aim at the weight reduction, and plural sealer members 47a which are capable of adhering to the back face of the outer panel 11 are provided around these punched portions.

As shown in FIGS. 2 and 5, the covering member 48 which extends longitudinally and a beltline-seal inner member (not illustrated) is provided is attached to the beltline-reinforcement inner member 44 (the inner upper vertical wall portion 44a). The covering member 48 is configured to have a nearly L-shaped cross section and cover over a gap between the door glass 61 and the beltline-reinforcement inner member 44. The door glass unit 60 comprises the door glass 61, a regulator mechanism 62 to move the door glass 61 vertically, and so on. The regulator mechanism 62 includes a pair of front-and-rear guide rails to guide the door glass 61, a motor portion to drive the door glass 61, and others. The regulator mechanism 62 is configured such that its upper portion is fixed to the inner upper vertical wall portion 44a at two points and fixed to the inner lower vertical wall portion 44b at a single point and its lower part is fixed to the lower wall portion 45 at a single point.

Next, the first through third seal members 56-58 will be described. The first through third seal members 56-58 are respectively made of a resilient body (e.g., a rubber material) including a hollow portion. As shown in FIGS. 2, 5 and 7, the first seal member 56 is arranged at the most outer peripheral side, the second seal member 57 is arranged on an inner-peripheral side of the first seal member 56, and the third seal member 58 is arranged on the inner-peripheral side of the second seal member 57.

The first seal member 56 seals a lower portion and a rear portion of the frame member 32, including the corner portion 41c, against the vehicle-body side. This is because there is a concern that in a case where the seal member is arranged at a front-end edge portion of the inner member 30, a reaction force is generated in an area around the hinges 51, so that a smooth door-closing operation may be hindered. The second and third seal members 52, 53 seal a range which extends from the front-side upper end portion to the rear-side upper end portion of the frame member 32 by way of the lower portion of the frame member 32 against the vehicle-body side.

As shown in FIGS. 11, 12, 14 and 16, the first seal member 56 is fixed to a lower portion of the front-side vertical wall portion 41, a lower portion of the rear-side vertical wall portion 42, and the lower wall portion 45 by plural fasteners f1 which extend in the vehicle width direction. The plural fasteners f1 are arranged at the flange portion 42f of the rear-side vertical wall portion 42 such that they are aligned in a peripheral direction closely to the fastening members b1, and the first seal member 56 fixed to the flange portion 42f seals a gap between the center pillar 4 and the rear-side vertical wall portion 42. Thereby, the first seal member 56 covers each head portion of the fastening members b1 from an inward side, in the vehicle width direction, of the cabin, so that the fastening members b1 are prevented from being visible from a passenger, thereby improving the appearance.

Further, the first seal member 56 includes a gap covering portion 56a which extends outwardly, in the vehicle width direction, from its outer peripheral edge portion. This gap covering portion 56a is engaged with the bent portion 42e, in other words, this gap covering portion 56a clamps the bent portion 42e in cooperation with an inner peripheral portion and covers a gap which is generated at a butted portion of the frame attachment portion 22c and the flange portion 42f from an outer periphery. Thereby, the first seal member 56 is firmly attached to the flange portion 42f and also the appearance improvement is attained. At the lower portion of the front-side vertical wall portion 41 as well, the plural fasteners f1 are arranged at the flange portion 42f such that they are aligned with the fastening members b1 in the peripheral direction similarly to the rear-side vertical wall portion 42, and the gap covering portion 56a covers a gap which is generated at a butted portion to the flange portion 41f from the outer periphery. A seal pressure (inner-contact pressure) of this first seal member 56 is set to be lower than that of the second seal member 57.

As shown in FIGS. 11, 12, 14-16, the second seal member 57 is fixed to the font-side vertical wall portion 41 and the rear-side vertical wall portion 42 by plural fasteners f2 which extend in the vehicle width direction, and fixed to the lower wall portion 45 by plural fasteners f2 which extend in the vertical direction. The second seal member 57 is a main seal member which seals the cabin inside-and-outside between the side sill 2/the hinge pillar 3/the center pillar 4 and the inner member 30. The seal pressure of the second seal member 57 is set to be higher than that of the first or third seal members 56, 58.

As shown in FIGS. 11-16, the third seal member 58 is fixed to the front-side font side vertical wall portion 41, the rear-side vertical wall portion 42, and the lower wall portion 45 by plural fasteners f3 which extend in the vehicle width direction. The third seal member 58 is a seal member which seals a space between the interior trim 7 and the door trim 59. The third seal member 58 has hollow portions which correspond to the interior trim 7 and the door trim 59, respectively, and the fasteners f3 are arranged between the respective hollow portions.

Next, the operations and effects of the side door structure of the vehicle V will be described. According to the present side door structure, since there are provided the hinge-reinforcement member 54 connected to the hinges 51 and reinforcing the hinge attachment portions 41d where the hinges 51 are attached to the front-side vertical wall portion 41 and the latch-reinforcement member 42d connected to the latch device 52 and reinforcing the latch-attachment portion 42d where the latch device 52 is attached to the rear-side vertical wall portion 42, connection of the hinges 51 connected to the vehicle body and the front-side vertical wall portion 41 can be firm and connection of the latch device 52 connected to the vehicle body and the rear-side vertical wall portion 42 can be firm. Further, since the front-side vertical wall portion 41 and the rear-side vertical wall portion 42 are configured as the casting vertical wall portion which is made of the casting, the light weight of the side door 1 can be attained by the casting molding using the light-alloy material, such as the aluminum alloy. Moreover, since the hinge-reinforcement member 54 and the latch-reinforcement member 55 which are provided at the casting vertical wall portion are configured to have the higher ductility than the casting vertical wall portion and connected to the impact bar 46, even in a case where the portions of the casting vertical wall portion which are positioned around the impact-bar attachment portions (41s, 41t, 42s, 42t) get broken because of the stress concentration in the vehicle side collision, the collision load applied to the impact bar 46 can be dispersed to the vehicle body by way of the hinge-reinforcement member 54 and the latch-reinforcement member 55 which are provided at the casting vertical wall portion, so that the impact bar 46 can be properly prevented from coming into the cabin.

Since the front-side vertical wall portion 41 and the rear-side vertical wall portion 42 are configured as the casting vertical wall portions which are made of the casting, respectively, and the both-end portions of the impact bar 46 are connected to the hinge-reinforcement member 54 and the latch-reinforcement member 55, respectively, the light weight of the side door 1 can be attained more properly. Further, the collision load applied to the impact bar 46 can be dispersed to the vehicle body by way of the hinge-reinforcement member 54 and the latch reinforcement member 55, so that the impact bar 46 can be prevented from coming into the cabin more properly.

Since the front-side vertical wall portion 41 includes the plural front-side attachment portions 41s, 41t which are arranged along the longitudinal direction of the impact bar 46 and the plural rib portions 41u which extend in the vehicle width direction and connect the plural front-side attachment portions 41s, 41t and the rear-side vertical wall portion 42 includes the plural rear-side attachment portions 42s, 42t which are arranged along the longitudinal direction of the impact bar 46 and the single rib portion 42u which extends in the vehicle width direction and connects the plural rear-side attachment portions 42s, 42t, a bending moment can be generated at the both end portions of the impact bar 46, respectively, so that the degree of the impact bar's coming into the cabin in the vehicle side collision can be reduced.

Since the front-side vertical wall portion 41 is provided with the pair of upper-and-lower hinges 51, the hinge-reinforcement member 54 is provided to reinforce the hinge attachment portions 41d where the pair of hinges 51 are attached, and the front end portion of the impact bar 46 is connected to the hinge-reinforcement member 54 at the position which is located between the pair of hinges 51, the collision load applied to the impact bar 46 can be dispersed to the pair of upper-and-lower hinges 51 by way of the hinge-reinforcing member 54, so that the support rigidity of the front end portion of the impact bar 46 can be improved.

Since the rear-side vertical wall portion 42 is provided to extend forwardly, in the vehicle longitudinal direction, from the corner portion 42c which is formed at the lower end portion, the latch-reinforcement member 55 is provided to extend from the latch attachment portion 42d to the corner portion 42c, and the rear end portion of the impact bar 46 is connected to the latch-reinforcement member 55 at the corner portion 42c, the support rigidity of the rear end portion of the impact bar 46 can be improved.

Finally, modifications where the above-described embodiment are changed partially will be described.

1] While the above-described embodiment exemplifies the outer member 10 and the inner member 30 which are basically made of the aluminum-alloy material, any material, such as the magnesium alloy or the high-strength resin material, such as CFRP, is applicable as long as it can attain the weight reduction. In a case where the high-strength resin material is applied, the hinge-reinforcement member 54 and the latch-reinforcement member 55 are a reinforcement member for resin.

2] While the above-described embodiment exemplifies the casting vertical wall portion which comprises the front-side vertical wall portion 41 and the rear-side vertical wall portion 42, only the front-side vertical wall portion 41 may be configured as the casting vertical wall portion or only the rear-side vertical wall portion 42 may be configured as the casting vertical wall portion. Further, in a case where only the front-side vertical wall portion 41 is configured as the casting vertical wall portion and the rear-side vertical wall portion 42 is a general steel-plate-made vertical wall portion, it is necessary that only the hinge-reinforcement member 54 has the higher ductility than the front-side vertical wall portion 41 and it is unnecessary that the latch-reinforcement member 55 has the higher ductility than the rear-side vertical wall portion 42.

3] While the above-described embodiment exemplifies the impact bar 46 which is attached to the frame member 32 at the front-side attachment portions 41s, 41t and the rear-side attachment portions 42s, 42t, it may be attached at a single attachment point or at three or more attachment points. Further, the number of attachment point of the front-side attachment portions and the number of attachment point of the rear-side attachment portions may be differentiated.

4] While the above-described embodiment exemplifies a case where the front-side attachment portions 41s, 41t are connected by the upper-and-lower two rib portions 41u and the rear-side attachment portions 42s, 42t are connected by the single rib portion 42u, the front-and-rear both attachment portions may be connected by the single rib portion or the plural rib portions. Herein, the number of rib portions can be set arbitrarily.

5] While the above-described embodiment exemplifies a case where the beltline-reinforcement outer member 43 and the beltline-reinforcement inner member 44 are not connected to the hinge-reinforcement member 54 and the latch-reinforcement member 55, respectively, these members 43, 44 may be connected to the members 54, 55, respectively. In this case, the hinge-reinforcement member 54 is provided to extend from the hinge attachment portions 41d to the upper end portion of the front-side vertical wall portion 41, the latch-reinforcement member 55 is provided to extend from the latch attachment portion 42d to the upper end portion of the rear-side vertical wall portion 42, the respective front-and-rear both end portions of the beltline-reinforcement outer member 43 and the beltline-reinforcement inner member 44 are fastened to the respective upper end portions of the hinge-reinforcement member 54 and the latch-reinforcement member 55. Thereby, the collision load applied to the impact bar 46 is dispersed to the vehicle body by way of the hinges 51 and the latch device 52 and also dispersed to the beltline-reinforcement outer member 43 and the beltline-reinforcement inner member 44, so that the impact bar 46 can be prevented from coming into the cabin more properly.

6] The present disclosure should not be limited to the above-described example and modifications and any other modifications or improvements may be applied within the scope of a spirit of the present disclosure.

What is claimed is:

1. A side door structure of a vehicle, comprising:
    an outer member;
    an inner member connected to said outer member and including a front-side vertical wall portion and a rear-side vertical wall portion which are positioned respectively at a front side and a rear side, in a vehicle longitudinal direction, of the inner member, the front-side vertical wall portion being provided with a hinge rotatable relative to a vehicle body, the rear-side vertical wall portion being provided with a latch device capable of locking or unlocking relative to the vehicle body;
    an impact bar provided to extend from a front-side attachment portion which is formed at said front-side vertical wall portion to a rear-side attachment portion which is formed at said rear-side vertical wall portion;
    a hinge-reinforcement member connected to said hinge and reinforcing a hinge attachment portion where the hinge is attached to said front-side vertical wall portion; and
    a latch-reinforcement member connected to said latch device and reinforcing a latch-attachment portion where the latch device is attached to said rear-side vertical wall portion,
    wherein at least one of said front-side vertical wall portion and said rear-side vertical wall portion is configured as a cast or resin-made vertical wall portion which is made by casting or of high-strength resin, and said hinge-reinforcement member and/or said latch-reinforcement member which are provided at said respective cast or resin-made vertical wall portion are configured to have higher ductility than the cast or resin-made vertical wall portion and connected to said impact bar.

2. The side door structure of the vehicle of claim 1, wherein said front-side vertical wall portion and said rear-side vertical wall portion are configured as the cast or resin-made vertical wall portions which are made of the casting or high-strength resin, respectively, and both end portions of said impact bar are connected to said hinge-reinforcement member and said latch-reinforcement member, respectively.

3. The side door structure of the vehicle of claim 2, wherein said front-side attachment portion includes a plurality of front-side attachment portions which are arranged along a longitudinal direction of said impact bar and a single or plurality of rib portions which extend in a vehicle width direction and connect said plural front-side attachment portions, and said rear-side attachment portion includes a plurality of rear-side attachment portions which are arranged along the longitudinal direction of said impact bar and a single or plurality of rib portions which extend in the vehicle width direction and connect said plural rear-side attachment portions.

4. The side door structure of the vehicle of claim 3, wherein said front-side vertical wall portion is provided with a pair of upper and lower hinges, said hinge-reinforcement member is provided to reinforce the hinge attachment portion where said pair of hinges are attached, and a front end portion of said impact bar is connected to said hinge-reinforcement member at a position which is located between said pair of hinges.

5. The side door structure of the vehicle of claim 4, said rear-side vertical wall portion is provided to extend forwardly, in the vehicle longitudinal direction, from a corner portion which is formed at a lower end portion, said latch-reinforcement member is provided to extend from said latch attachment portion to said corner portion, and a rear end portion of said impact bar is connected to said latch-reinforcement member at said corner portion.

6. The side door structure of the vehicle of claim 5, wherein said inner member is provided with a beltline-reinforcement member which connects respective upper end portions of said front-side vertical wall portion and said rear-side vertical wall portion, said hinge-reinforcement member is provided to extend from said hinge attachment portion to the upper end portion of the front-side vertical wall portion, said latch-reinforcement member is provided to extend from said latch attachment portion to the upper end portion of the rear-side vertical wall portion, and front and rear end portions of said beltline-reinforcement member are connected to respective upper end portions of the hinge-reinforcement member and the latch-reinforcement member.

7. The side door structure of the vehicle of claim 2, wherein said front-side vertical wall portion is provided with a pair of upper and lower hinges, said hinge-reinforcement member is provided to reinforce the hinge attachment portion where said pair of hinges are attached, and a front end portion of said impact bar is connected to said hinge-reinforcement member at a position which is located between said pair of hinges.

8. The side door structure of the vehicle of claim 2, said rear-side vertical wall portion is provided to extend forwardly, in the vehicle longitudinal direction, from a corner portion which is formed at a lower end portion, said latch-reinforcement member is provided to extend from said latch attachment portion to said corner portion, and a rear end portion of said impact bar is connected to said latch-reinforcement member at said corner portion.

9. The side door structure of the vehicle of claim 2, wherein said inner member is provided with a beltline-reinforcement member which connects respective upper end portions of said front-side vertical wall portion and said rear-side vertical wall portion, said hinge-reinforcement member is provided to extend from said hinge attachment portion to the upper end portion of the front-side vertical wall portion, said latch-reinforcement member is provided to extend from said latch attachment portion to the upper end portion of the rear-side vertical wall portion, and front and rear end portions of said beltline-reinforcement member are connected to respective upper end portions of the hinge-reinforcement member and the latch-reinforcement member.

10. The side door structure of the vehicle of claim 3, said rear-side vertical wall portion is provided to extend forwardly, in the vehicle longitudinal direction, from a corner portion which is formed at a lower end portion, said latch-reinforcement member is provided to extend from said latch attachment portion to said corner portion, and a rear end portion of said impact bar is connected to said latch-reinforcement member at said corner portion.

11. The side door structure of the vehicle of claim 3, wherein said inner member is provided with a beltline-reinforcement member which connects respective upper end portions of said front-side vertical wall portion and said rear-side vertical wall portion, said hinge-reinforcement member is provided to extend from said hinge attachment portion to the upper end portion of the front-side vertical wall portion, said latch-reinforcement member is provided to extend from said latch attachment portion to the upper end portion of the rear-side vertical wall portion, and front and rear end portions of said beltline-reinforcement member are connected to respective upper end portions of the hinge-reinforcement member and the latch-reinforcement member.

12. The side door structure of the vehicle of claim 4, wherein said inner member is provided with a beltline-reinforcement member which connects respective upper end portions of said front-side vertical wall portion and said rear-side vertical wall portion, said hinge-reinforcement member is provided to extend from said hinge attachment portion to the upper end portion of the front-side vertical wall portion, said latch-reinforcement member is provided to extend from said latch attachment portion to the upper end portion of the rear-side vertical wall portion, and front and rear end portions of said beltline-reinforcement member are connected to respective upper end portions of the hinge-reinforcement member and the latch-reinforcement member.

13. The side door structure of the vehicle of claim 7, said rear-side vertical wall portion is provided to extend forwardly, in the vehicle longitudinal direction, from a corner portion which is formed at a lower end portion, said latch-reinforcement member is provided to extend from said latch attachment portion to said corner portion, and a rear end portion of said impact bar is connected to said latch-reinforcement member at said corner portion.

14. The side door structure of the vehicle of claim 7, wherein said inner member is provided with a beltline-reinforcement member which connects respective upper end portions of said front-side vertical wall portion and said rear-side vertical wall portion, said hinge-reinforcement member is provided to extend from said hinge attachment portion to the upper end portion of the front-side vertical wall portion, said latch-reinforcement member is provided to extend from said latch attachment portion to the upper end portion of the rear-side vertical wall portion, and front and rear end portions of said beltline-reinforcement member are connected to respective upper end portions of the hinge-reinforcement member and the latch-reinforcement member.

15. The side door structure of the vehicle of claim 8, wherein said inner member is provided with a beltline-reinforcement member which connects respective upper end portions of said front-side vertical wall portion and said rear-side vertical wall portion, said hinge-reinforcement member is provided to extend from said hinge attachment portion to the upper end portion of the front-side vertical wall portion, said latch-reinforcement member is provided to extend from said latch attachment portion to the upper end portion of the rear-side vertical wall portion, and front and rear end portions of said beltline-reinforcement member are connected to respective upper end portions of the hinge-reinforcement member and the latch-reinforcement member.

16. The side door structure of the vehicle of claim 10, wherein said inner member is provided with a beltline-reinforcement member which connects respective upper end portions of said front-side vertical wall portion and said rear-side vertical wall portion, said hinge-reinforcement member is provided to extend from said hinge attachment portion to the upper end portion of the front-side vertical wall portion, said latch-reinforcement member is provided to extend from said latch attachment portion to the upper end portion of the rear-side vertical wall portion, and front and rear end portions of said beltline-reinforcement member are connected to respective upper end portions of the hinge-reinforcement member and the latch-reinforcement member.

17. The side door structure of the vehicle of claim 13, wherein said inner member is provided with a beltline-reinforcement member which connects respective upper end portions of said front-side vertical wall portion and said rear-side vertical wall portion, said hinge-reinforcement member is provided to extend from said hinge attachment portion to the upper end portion of the front-side vertical wall portion, said latch-reinforcement member is provided to extend from said latch attachment portion to the upper end portion of the rear-side vertical wall portion, and front and rear end portions of said beltline-reinforcement member are connected to respective upper end portions of the hinge-reinforcement member and the latch-reinforcement member.

18. The side door structure of the vehicle of claim 1, wherein said front-side vertical wall portion and said rear-side vertical wall portion are respectively made of an aluminum-alloy casting having a specified thickness, and said hinge-reinforcement member and said latch-reinforcement member are respectively made of a pressed steel plate which has higher ductility than the aluminum-alloy casting.

\* \* \* \* \*